United States Patent
Kaushik et al.

(10) Patent No.: US 9,613,157 B2
(45) Date of Patent: Apr. 4, 2017

(54) METHOD AND APPARATUS FOR TRANSLATING JAVASCRIPT ACROSS DIFFERENT HOST ENVIRONMENTS

(71) Applicant: Adobe Systems Incorporated, San Jose, CA (US)

(72) Inventors: Nishant Kaushik, Jhajjar (IN); Yash Kumar Gupta, Agra (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 880 days.

(21) Appl. No.: 13/934,417

(22) Filed: Jul. 3, 2013

(65) Prior Publication Data

US 2015/0012809 A1    Jan. 8, 2015

(51) Int. Cl.
  *G06F 17/22* (2006.01)
  *G06F 17/00* (2006.01)
  *G06F 17/30* (2006.01)
  *G06F 9/45* (2006.01)

(52) U.S. Cl.
  CPC .......... *G06F 17/30893* (2013.01); *G06F 8/51* (2013.01)

(58) Field of Classification Search
  CPC ............. G06F 17/243; G06F 17/30569; G06F 17/30899; G06F 8/51
  See application file for complete search history.

(56) References Cited

U.S. PATENT DOCUMENTS

| | | | | |
|---|---|---|---|---|
| 6,732,330 B1* | 5/2004 | Claussen | ............ | G06F 9/45512 707/E17.118 |
| 6,738,951 B1* | 5/2004 | Weiss | ................. | G06F 17/2247 715/234 |
| 7,054,952 B1* | 5/2006 | Schwerdtfeger | .. | G06F 17/30011 709/246 |
| 7,284,193 B1* | 10/2007 | Lindhorst | ........... | G06F 17/3089 707/999.1 |
| 7,587,668 B2* | 9/2009 | Bala | ...................... | G06F 9/4446 715/234 |
| 2002/0122060 A1* | 9/2002 | Markel | ............... | G06F 17/2247 715/760 |
| 2002/0129129 A1* | 9/2002 | Bloch | ....................... | G06F 8/61 709/220 |
| 2004/0260982 A1* | 12/2004 | Bhowmik | ........... | G06F 11/2294 714/43 |
| 2005/0010910 A1* | 1/2005 | Lindhorst | ............... | G06F 9/547 717/139 |
| 2006/0156287 A1* | 7/2006 | Vikram | ............... | G06F 11/3684 717/124 |

(Continued)

*Primary Examiner* — Scott Baderman
*Assistant Examiner* — Mario M Velez-Lopez
(74) *Attorney, Agent, or Firm* — Keller Jolley Preece

(57) ABSTRACT

A computer implemented method and apparatus for translating JAVASCRIPT code across different host environments. The method comprises accessing a document comprising JAVASCRIPT code of a first type; parsing the JAVASCRIPT code of the first type in the document; tracking a location of an event or action in the document in which the JAVASCRIPT code of the first type is present; translating the parsed JAVASCRIPT code of the first type into JAVASCRIPT code of a second type; merging the translated JAVASCRIPT code into a location in a translated JAVASCRIPT file, wherein the location corresponds to the location tracked in the document; and exporting the translated JAVASCRIPT file.

20 Claims, 3 Drawing Sheets

(56) References Cited

U.S. PATENT DOCUMENTS

| | | | |
|---|---|---|---|
| 2008/0082473 A1* | 4/2008 | Grabarnik | G06F 17/2247 706/47 |
| 2008/0082964 A1* | 4/2008 | Bockenhauer | G06F 9/4443 717/115 |
| 2013/0160127 A1* | 6/2013 | Jeong | G06F 21/566 726/24 |
| 2014/0157243 A1* | 6/2014 | Vargas | G06F 8/51 717/137 |

* cited by examiner

METHOD AND APPARATUS FOR TRANSLATING JAVASCRIPT ACROSS DIFFERENT HOST ENVIRONMENTS

BACKGROUND OF THE INVENTION

Field of the Invention

Embodiments of the present invention generally relate to software interoperability and compatibility and, more particularly, to a method and apparatus for translating JAVASCRIPT code across different host environments.

Description of the Related Art

JAVASCRIPT is a popular client-side scripting language that is used in various host environments such as ADOBE® ACROBAT®, a user's web browser, and the like. JAVASCRIPT® code can enhance a HyperText Markup Language (HTML) web page or a Portable Document Format (PDF) document so that it contains dynamic form fields, can dynamically alter displayed document content, dynamically capture user-entered data, as well as other dynamic interactions with a user, such as display buttons to initiate user actions. Hence, an author may customize the behavior of a PDF document or rendered web page with JAVASCRIPT code so as to make the PDF document or web page highly dynamic. For example, when a user opens a PDF document that includes JAVASCRIPT code using ADOBE ACROBAT, and then the user interacts with the PDF document, ACROBAT monitors the user interaction and executes the appropriate JAVASCRIPT code.

When a PDF document that includes JAVASCRIPT code is rendered on a web page in a web browser, the PDF document is converted to HyperText Markup Language (HTML), which is able to be interpreted by the web browser. However, although ACROBAT JAVASCRIPT code and Browser JAVASCRIPT code are the same language, the two are of different dialects. The two dialects have a common language foundation, identical grammar, and have common core JAVASCRIPT code objects. The difference lies in the use of different extension objects and different Application Programming Interfaces (APIs). As a result, when the PDF document is converted to HTML, the JAVASCRIPT code is lost in translation and the dynamic content portion of the PDF document is reduced to static content.

Currently, a PDF reader must be placed on each web browser in order to translate the JAVASCRIPT code so as to maintain the interactive nature of the PDF document content. However, supporting all browser platforms is cost and time prohibitive. In addition, mobile platforms restrict the implementation of a full-fledged PDF reader. Even furthermore, iOS (the APPLE® Operating System) does not even allow a scripting engine inside of an application. Thus, ACROBAT JAVASCRIPT code cannot run on iOS.

Therefore, there is a need for a method and apparatus for translating JAVASCRIPT code across different host environments.

SUMMARY OF THE INVENTION

A method and apparatus for translating JAVASCRIPT code across different host environments substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

Figure 1:
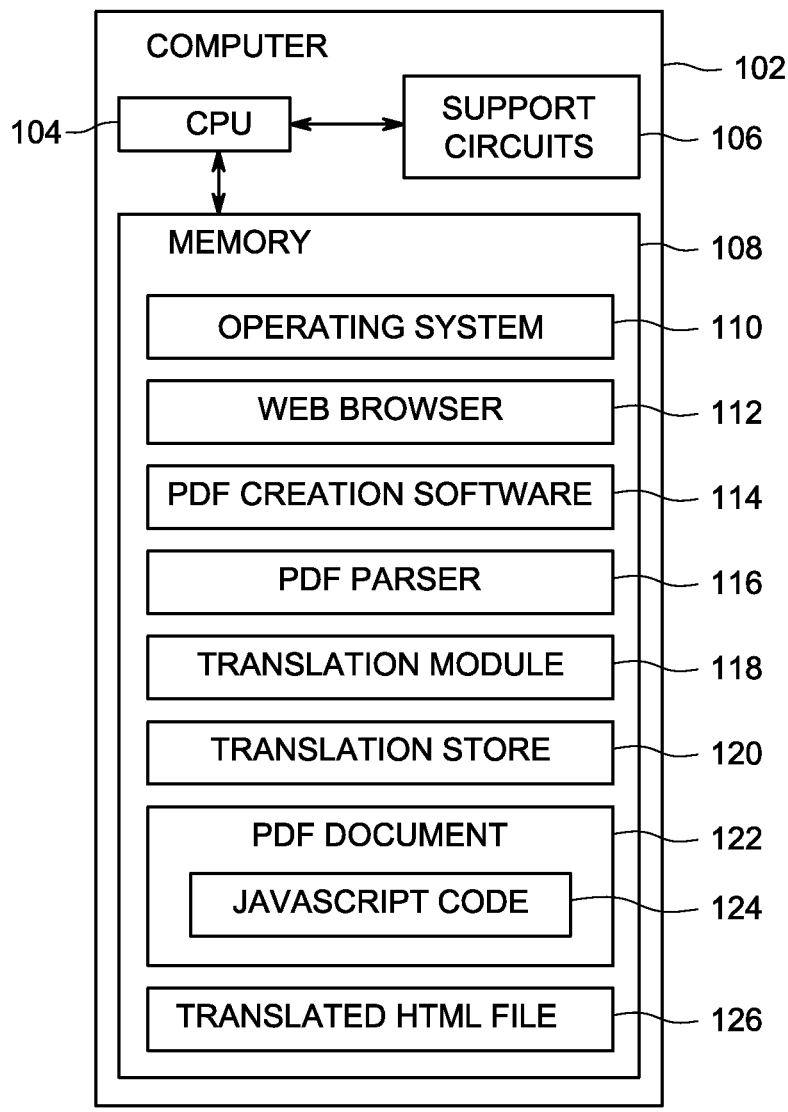
FIG. 1 is a block diagram of an apparatus for translating JAVASCRIPT code across different host environments, according to one or more embodiments.

While the method and apparatus is described herein by way of example for several embodiments and illustrative drawings, those skilled in the art will recognize that the method and apparatus for translating JAVASCRIPT code across different host environments is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for translating JAVASCRIPT code across different host environments defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. The phrase "PDF document" refers to any PDF document created using a PDF creation application, such as ADOBE® ACROBAT, ACROBAT.COM, and the like.

DETAILED DESCRIPTION OF EMBODIMENTS

Embodiments of the present invention include a method and apparatus for translating JAVASCRIPT code across different host environments. Although the embodiments described herein discuss translating PDF JAVASCRIPT code to Browser JAVASCRIPT code, the methods described herein may also be used to translate Browser JAVASCRIPT code to PDF JAVASCRIPT code. Further, the embodiments described herein may be used to translate a JAVASCRIPT code of a first type to a JAVASCRIPT code of a second type.

When a PDF document is rendered by a web browser, the PDF document is translated into HyperText Markup Language (HTML) using, for example PDF2HTML or MOZILLA's PDF.js. However, the JAVASCRIPT code is not understood in HTML. The embodiments access a PDF document and convert the JAVASCRIPT code in the PDF document so that it is readable in HTML in a web browser. The method parses the JAVASCRIPT code from the PDF document. For each object and/or function, the method determines whether it is an application-specific object and/or function, or whether it is an object or function that is core to JAVASCRIPT code, meaning that the object or function is readable in the environment of both the application that created the PDF as well as the Browser rendering it, and therefore, need not be translated. If the object/function is application-specific, the embodiments access a translation store, and translates the PDF JAVASCRIPT code to Browser JAVASCRIPT code, such that it is understandable by the web browser. The Browser JAVASCRIPT code is merged with the HTML code. If the object/function is not application-specific, then the JAVASCRIPT code is simply copied directly to the HTML code. The JAVASCRIPT translation overlaps with the HTML generation phases of PDF2HTML. Thus, the embodiments create a complete dynamic translation of a dynamic PDF document.

Advantageously, users who wish to render a PDF document in a browser, wherein the PDF document that was created, for example, using ADOBE ACROBAT, may do so without losing the interactive dynamic nature of the JAVASCRIPT code provided in the original PDF document. Further, one the translation store is created for converting from a first JAVASCRIPT to a second JAVASCRIPT, the translation store requires minimal maintenance.

Various embodiments of a method and apparatus for translating JAVASCRIPT code across different host environments are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of an apparatus 100 for translating JAVASCRIPT code across different host environments, according to one or more embodiments. The apparatus 100 includes a computer 102. The computer 102 is a computing device, such as a desktop computer, laptop, tablet computer, and the like. The computer 102 includes a Central Processing Unit (CPU) 104, support circuits 106, and a memory 108. The CPU 104 may include one or more commercially available microprocessors or microcontrollers that facilitate data processing and storage. The various support circuits 106 facilitate the operation of the CPU 104 and include one or more clock circuits, power supplies, cache, input/output circuits, and the like. The memory 108 includes at least one of Read Only Memory (ROM), Random Access Memory (RAM), disk drive storage, optical storage, removable storage and/or the like.

The memory 108 includes an operating system 110, a web browser 112, PDF creation software 114, a PDF parser 116, a translation module 118, a translation store 120, a PDF document 122, and a translated HTML file 126. The PDF parser 116, translation module 118 and translation store 120 are configured to provide additional functionalities to the browser (e.g., an add-on, plug-in or extension) that facilitates content rendering in accordance with one or more embodiments of the invention. Furthermore, the term "browser" is intended to include any software, application, web tool, applet, widget and/or the like that can be used to render content for display. The PDF document 122 includes JAVASCRIPT code 124. The translation store 120 includes a mapping of PDF JAVASCRIPT code to JAVASCRIPT code understandable by the web browser 112. The operating system 110 may include various commercially known operating systems.

According to some embodiments, the web browser 112 is utilized to view the PDF document 122 (including JAVASCRIPT code 124) or some other PDF document substantially similar to document 122 but created by a computer different from computer 102. Examples of web browser 112 may include, but are not limited to, FIREFOX®, GOOGLE® CHROME™, INTERNET EXPLORER®, OPERA™, and SAFARI®, ANDROID® browser, FIREFOX® for mobile, INTERNET EXPLORER® Mobile, among others. The PDF creation software 114 may be any software application, such as ADOBE ACROBAT, capable of creating a PDF document 122 including JAVASCRIPT code 124.

When the PDF document 122 is rendered in the web browser 112, the PDF document 122 is converted to HTML using any translation software, for example, PDF2HTML. Before the HTML is rendered by the web browser 112, the PDF parser 116 parses the JAVASCRIPT code 124 in the PDF document 122. The translation module 118 examines each JAVASCRIPT code object and/or function and determines whether the JAVASCRIPT code is application-specific or core. An object and/or function is a core object/function if the object or function is readable in the environment of both the application that created the PDF as well as the Browser rendering it. Example of core JAVASCRIPT objects include string, number, array, date, and the like. If the JAVASCRIPT code is determined to be application specific, it means it is not readable by the web browser 112. For example in PDF JAVASCRIPT, an application layer object is "App", while in Browser JAVASCRIPT, the application layer object is "window". In PDF JAVASCRIPT, a document layer object is "doc", while in Browser JAVASCRIPT, the document layer object is "document". In PDF JAVASCRIPT, content layer objects include "bookmark", "field" and the like, while in Browser JAVASCRIPT, the content layer objects include "forms", "Element", "body" and the like. Similarly, events (or actions) may be application-specific. For example, In PDF JAVASCRIPT, an open document event is "doc/open", while in Browser JAVASCRIPT, the open document event is "onLoad". In PDF JAVASCRIPT, a field click event is "field/click", while in Browser JAVASCRIPT, the field click event is "onClick". In PDF JAVASCRIPT, a calculate event is "field/calculate", while in Browser JAVASCRIPT, the calculate event is "onChange". If the JAVASCRIPT code is determined to be application specific, the translation module 118 accesses the translation store 120 to look up a mapping of the PDF JAVASCRIPT code to Browser JAVASCRIPT code. The translation module 118 outputs the mapped content into translated JAVASCRIPT code readable in the web browser 112 and merges the translated content in the appropriate place in the translated HTML file 126. If the JAVASCRIPT code is determined to be core, translation is not required and the JAVASCRIPT code is merged into the translated HTML file 126 without any changes.

Figure 2:
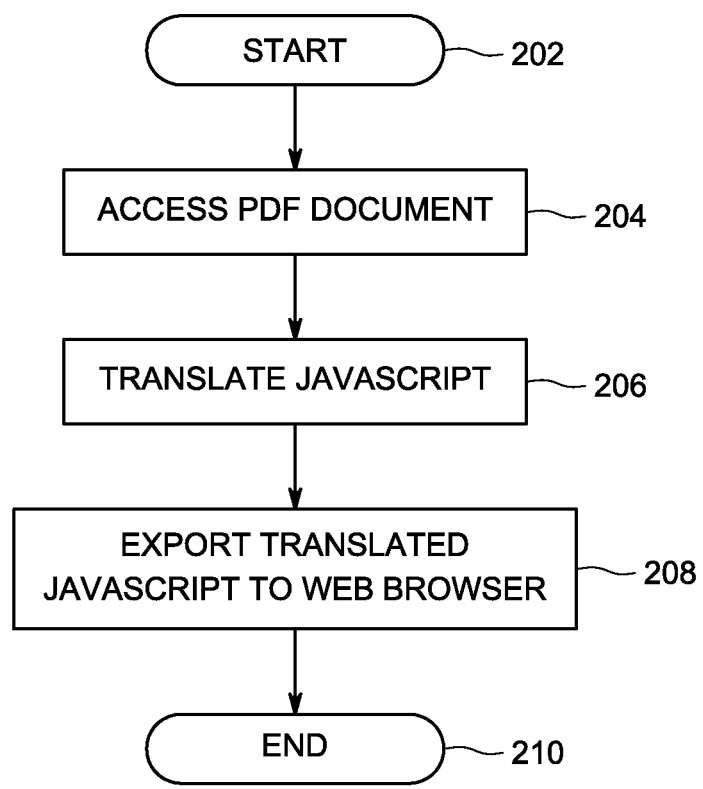
FIG. 2 depicts a flow diagram of a method for translating JAVASCRIPT code across different host environments, as performed by the translation module of FIG. 1, according to one or more embodiments.

FIG. 2 depicts a flow diagram of a method 200 for translating JAVASCRIPT code across different host environments, as performed by the translation module 118 of FIG. 1, according to one or more embodiments. When a PDF document is rendered by a web browser, HTML is generated, using for example, PDF2HTML. However, the JAVASCRIPT code in the HTML is not understandable by the web browser. The method 200 translates the JAVASCRIPT code into Browser JAVASCRIPT code and merges the translated code in the appropriate places in HTML, thereby creating a completely dynamic translation. The method 200 starts at step 202 and proceeds to step 204.

At step 204, the method 200 accesses a PDF document. The PDF document includes JAVASCRIPT code that makes the PDF document interactive. Without translating the JAVASCRIPT code, the PDF document may become static content. The PDF document may include elements, such as hyperlinks, form fields, buttons, and the like. The JAVASCRIPT code defines what action should occur when a user interacts with these elements. For example, when a form field of a PDF is rendered in a web browser without JAVASCRIPT translation, it is useless because there is no validation and submission of the data entered in the form field. However, with the JAVASCRIPT translation, the form field works as designed.

The method 200 proceeds to step 206, where the method 200 translates the PDF JAVASCRIPT code to Browser JAVASCRIPT code and merges the translated code with HTML to make it understandable when being rendered by the web browser, as described in further detail with respect to FIG. 3, below.

The method 200 proceeds to step 208, where the method 200 exports the translated JAVASCRIPT code file to be rendered by the web browser, thereby maintaining the interactive nature of the original PDF document.

The method 200 proceeds to step 210, where the method 200 ends.

Figure 3:
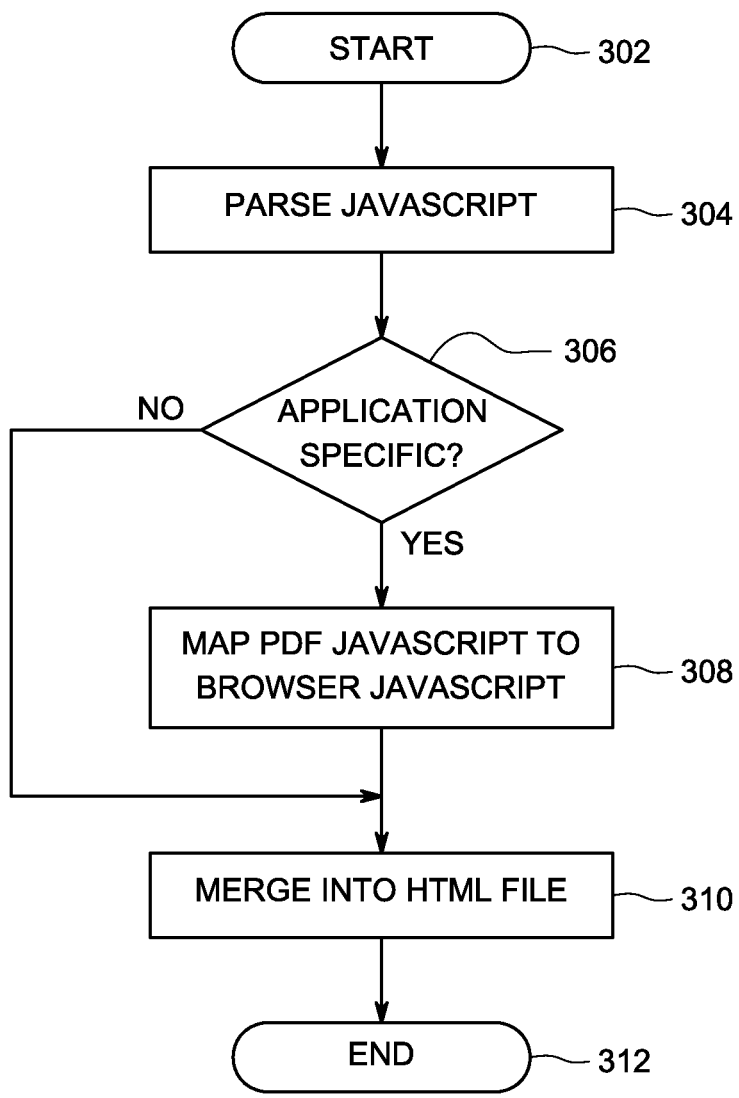
FIG. 3 depicts a flow diagram of a method for translating JAVASCRIPT code, as performed by the translation module of FIG. 1, according to one or more embodiments of the invention.

FIG. 3 depicts a flow diagram of a method 300 for translating JAVASCRIPT code, as performed by the translation module 118 of FIG. 1, according to one or more embodiments of the invention. Prior to the execution of method 300, HTML is generated from the PDF document, using for example, PDF2HTML. However, the JAVASCRIPT code is not understandable by the web browser. The method 300 parses the JAVASCRIPT code from the PDF document and translates the JAVASCRIPT code into Browser JAVASCRIPT code. The translated code is merged in the appropriate places in the HTML code, as described below, thereby creating a completely dynamic translation that is readable when the PDF document is rendered in the web browser.

The method 300 starts at step 302 and proceeds to step 304, where the method 300 parses the PDF JAVASCRIPT code. The method 300 identifies an object and/or function in the document. An object is an instance of a class in JAVASCRIPT. Each object has one or more methods that may act on the object. For example, a Date object may be an object that includes a data and methods for acting on the Date object may include "set" to set the value of the date object or "get" to get the value of the Date object. A function object specifies code that is evaluated each time the function is used. The method 300 also identifies in what event (or action) the JAVASCRIPT code is present. Events (or actions), are triggers that cause JAVASCRIPT code to execute. An example of an event may be "open a document" or "click in a field". For example, the PDF may include the following JAVASCRIPT code that is to be performed (or executed) on Document open, i.e., "OpenAction":

```
1 0 obj <<
/Type /Catalog
/Doc 2 0 R
/OpenAction <<
/S /JAVASCRIPT code
/JS (
var str="Viewer Version is "'
str += app.viewerVersion;
app.alert(str);
)
>>
>>
endobj
```

The method 300 parses the code and identifies as JAVASCRIPT code, the following:

```
var str="Viewer Version is "'
str += app.viewerVersion;
app.alert(str);
```

The method 300 proceeds to step 306, where the method 300 determines whether the objects are core JAVASCRIPT code objects, meaning they do not need to be translated, or whether the objects are application-specific objects, meaning they do need to be translated. There are predefined core JAVASCRIPT objects, namely Array, Boolean, Date, Function, Math, Number, RegExp, and String. JAVASCRIPT code objects that match one of these predefined objects is determined to be a core JAVASCRIPT object. In the example, "var str" is a core JAVASCRIPT code object. The string variable is understood in the PDF document as well as in the browser. However, the app.viewerVersion and the app.alert(str) are both application-specific as described previously because the application layer object "app" is not recognized by the browser, which has an application layer object of "window". The browser does not understand how to interpret these application-specific objects. Without translation, the browser may ignore this code or display an error to the user.

If at step 306, the method 300 determines the code includes core JAVASCRIPT code then the method 300 proceeds to step 310, where the method 300 copies the core code into a translated JAVASCRIPT code file. For example, the following line of JAVASCRIPT code is determined to be core JAVASCRIPT code:

var str="Viewer Version is"

Therefore, the method 300 copies the original line of code into the translated JAVASCRIPT code file for rendering in the browser.

However, if at step 306, the method 300 determines that the object and/or function is application-specific, the method 300 proceeds to step 308 where the method 300 accesses a translation store to find a mapping of the application-specific JAVASCRIPT code to Browser JAVASCRIPT code. In some embodiments, document information retrieved during parsing of the PDF document may be used in the mapping of the JAVASCRIPT code. In the current example, app.viewerVersion and the app.alert(str) of the "OpenAction" function are both application-specific. The translation store includes a mapping for these PDF JAVASCRIPT code objects.

For example, the translation of the OpenAction function may be:

```
ACRODOC = {
  app : {
    alert : function (msg) { alert(msg);
    }
    viewerVersion: 11.0 }
}
function docOpenAction( ) {
  var str = "Viewer Version is ";
  str += ACRODOC.app.viewerVersion;
  ACRODOC.app.alert(str);
}
```

The application-specific objects are defined in code understandable by the browser. Both app.alert and app.viewerVersion are defined in ACRODOC. The OpenAction function in the PDF JAVASCRIPT code is mapped to the docOpenAction function, understandable by the web browser. The calls app.viewerVersion and app.alert are mapped to ACRODOC.app.viewerVersion and ACRODOC.app.alert, which are defined in the translation.

It is also noted that the original "var str" line of code is unchanged as it is core JAVASCRIPT code and understandable by both the PDF application and the Browser application.

The method 300 proceeds to step 310, where the method 300 merges the translated JAVASCRIPT code into a translated HTML file. In the above example, the translated code from the OpenAction is placed where the HTML file where the browser event onLoad resides. When all JAVASCRIPT code is translated, the HTML file is ready for rendering by the web browser. The method 300 proceeds to step 312 and ends.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
accessing, on a client-computing device, a first document comprising scripting code of a first type; parsing, by the client-computing device, the scripting code of the first type in the first document; tracking, by the client-computing device, a location of an event or action in the first document in which the scripting code of the first type is present;
translating, by the client-computing device and prior to execution of the scripting code of the first type, the parsed scripting code of the first type into scripting code of a second type, wherein translating comprises mapping scripting code objects in scripting code of the first type to scripting code objects in scripting code of the second type, wherein there is a one-to-one mapping of scripting code of the first type to scripting code of the second type; merging, by the client-computing device, the translated scripting code into a location in a translated scripting file, wherein the location corresponds to the location tracked in the first document; and exporting, by the client-computing device, the translated scripting file for use with a second document, wherein one of the first document or the second document is a PDF document.

2. The method of claim 1, wherein the scripting code of the first type is Portable Document Format (PDF) scripting code and scripting code of the second type is Browser scripting code.

3. The method of claim 1, wherein the first document comprises at least one application-specific scripting code object.

4. The method of claim 3, wherein mapping scripting code objects in scripting code of the first type to scripting code objects in scripting code of the second type comprises mapping application-specific scripting code objects to browser readable scripting code objects.

5. The method of claim 2, wherein the Browser scripting code is in HyperText Markup Language (HTML).

6. The method of claim 4, wherein translating further comprises: identifying when a scripting code object is an application-specific scripting code object in scripting of the first type; accessing a translation store when the scripting code object is an application-specific scripting code object; and
converting the application-specific scripting code of the first type to scripting code of the second type.

7. The method of claim 1, further comprising merging the scripting code into the location in the translated scripting file, without translation, when the scripting code object is not an application-specific object, and wherein the location corresponds to the location tracked in the first document.

8. A system comprising:
a client-computing device; and
at least one non-transitory computer-readable storage medium storing instructions thereon that, when executed by the client-computing device, cause the system to:
access a first document comprising scripting code of a first type;
parse the scripting code of the first type in the first document;
track a location of an event or action in the first document in which the scripting code of the first type is present;
translate, prior to execution of the scripting code of the first type, the parsed scripting code into scripting code of a second type, wherein translating comprises mapping scripting code objects in scripting code of the first type to scripting code objects in scripting code of the second type, wherein there is a one-to-one mapping of scripting code of the first type to scripting code of the second type;
merge the translated scripting code into a location in a translated scripting file, wherein the location corresponds to the location tracked in the first document; and
export the translated scripting file for use with a second document, wherein one of the first document or the second document is a PDF document.

9. The system of claim 8, wherein the scripting code of the first type is Portable Document Format (PDF) scripting code and scripting code of the second type is Browser scripting code and wherein the Browser scripting code is in HyperText Markup Language (HTML).

10. The system of claim 8, wherein the first document comprises at least one application-specific scripting code object.

11. The system of claim 10, wherein mapping scripting code objects in scripting code of the first type to scripting code objects in scripting code of the second type comprises mapping application-specific scripting code objects to browser readable scripting code objects.

12. The system of claim 11, further comprising instructions that executed by the client-computing device cause the system to translate the parsed scripting code by causing the system to: identify when a scripting code object is an application-specific scripting code object in scripting of the first type;
access a translation store when the scripting code object is an application-specific scripting code object; and
convert the application-specific scripting code of the first type to scripting code of the second type.

13. The system of claim 8, further comprising instructions that, when executed by the client-computing device, cause the system to merge the scripting code into the location in the translated scripting file, without translation, when the scripting code object is not an application-specific object, and wherein the location corresponds to the location tracked in the first document.

14. A non-transitory computer readable medium for storing computer instructions that, when executed by at least one processor causes the at least one processor to perform a method for translating scripting code across different host environments comprising: accessing, on a client-computing device, a first document comprising scripting code of a first type; parsing, on the client-computing device, the scripting code of the first type in the first document; tracking, on the client-computing device, a location of an event or action in the first document in which the scripting code of the first type is present; translating, on the client-computing device and prior to execution of the scripting code of the first type, the parsed scripting code of the first type into scripting code of a second type, wherein translating comprises mapping scripting code object in scripting code of the first type to scripting code object in scripting code of the second type, wherein there is a one-to-one mapping of scripting code of the first type to scripting code of the second type; merging, on the client-computing device, the translated scripting code into a location in a translated scripting file, wherein the location corresponds to the location tracked in the first document; and exporting, on the client-computing device, the translated scripting file for use with a second document, wherein one of the first document or the second document is a PDF document.

15. The computer readable medium of claim 14, wherein the scripting code of the first type is Portable Document Format (PDF) scripting code and scripting code of the second type is Browser scripting code.

16. The computer readable medium of claim 14, wherein the first document comprises at least one application-specific scripting code object.

17. The computer readable medium of claim 16, wherein mapping scripting code objects in scripting code of the first type to scripting code objects in scripting code of the second type comprises mapping application-specific scripting code object to browser readable scripting code objects.

18. The computer readable medium of claim 15, wherein the Browser scripting code is in HyperText Markup Language (HTML).

19. The computer readable medium of claim 17, wherein translating further comprises: identifying when a scripting code object is an application-specific scripting code object in scripting of the first type; accessing a translation store when the scripting code object is an application-specific scripting code object; and converting the application-specific scripting code of the first type to scripting code of the second type.

20. The computer readable medium of claim 14, further comprising merging the scripting code into the location in the translated scripting file, without translation, when the scripting code object is not an application-specific object, and wherein the location corresponds to the location tracked in the first document.

* * * * *